No. 771,941. PATENTED OCT. 11, 1904.
H. SCHUMACHER.
MACHINE FOR SIZING TOBACCO LEAVES.
APPLICATION FILED DEC. 28, 1903.
NO MODEL. 5 SHEETS—SHEET 3.

Witnesses
G. Howard Walmsley
Irvine Miller

Inventor
Henry Schumacher;
By H. A. Toulmin,
Attorney

No. 771,941. PATENTED OCT. 11, 1904.
H. SCHUMACHER.
MACHINE FOR SIZING TOBACCO LEAVES.
APPLICATION FILED DEC. 28, 1903.
NO MODEL. 5 SHEETS—SHEET 4.

Witnesses
G. Howard Walmsley.
Savine Miller.

Inventor
Henry Schumacher,
By H. A. Toulmin,
Attorney

No. 771,941. Patented October 11, 1904.

UNITED STATES PATENT OFFICE.

HENRY SCHUMACHER, OF DAYTON, OHIO.

MACHINE FOR SIZING TOBACCO-LEAVES.

SPECIFICATION forming part of Letters Patent No. 771,941, dated October 11, 1904.

Application filed December 28, 1903. Serial No. 186,801. (No model.)

*To all whom it may concern:*

Be it known that I, HENRY SCHUMACHER, a citizen of the United States, residing at Dayton, in the county of Montgomery and State of Ohio, have invented certain new and useful Improvements in Machines for Sizing Tobacco-Leaves, of which the following is a specification, reference being had therein to the accompanying drawings.

This invention relates to machines for sizing tobacco-leaves, and has for its object to provide a machine whereby the leaves of tobacco may be rapidly, accurately, and cheaply sorted. This operation is now usually performed by hand-labor, which is objectionable not only on account of the high cost and slowness of the work, but also on account of the direct financial loss arising from the fact that the operators find it quicker and easier to bring the leaves to a uniform size by tearing off portions of the larger leaves than by properly sorting them, the scrap thus formed being worth but a small fraction of the amount paid for it while in the leaf.

It is the object of my invention to provide a machine which will overcome these difficulties and which will automatically deliver at each operative cycle of the machine all of the leaves upon which it is working of a size lying between two fixed limits of length.

To these and other ends my invention consists in certain novel features, which I will now proceed to describe and will then particularly point out in the claims.

In the accompanying drawings.

In the said drawings, 1 indicates the main frame of the machine, which may be mounted upon a suitable table or support. Within this main frame there is mounted an oscillating frame 2, the pivotal axis of which is indicated at 3. This frame comprises two lateral members 4 and suitable transverse members 5, the pivotal axis being located near the rear end of said oscillating frame and the sizing-rolls being mounted on said frame, near the front end thereof. These sizing-rolls are indicated, respectively, by the reference-numerals 6 and 7, the former indicating the lower roll, which is mounted directly in the oscillating frame 2, while the reference-numeral 7 indicates the upper roll, which is mounted in a movable frame supported on the oscillating frame. Each of the rolls is provided with a peripheral covering or working surface of yielding material 8, and I prefer for this purpose what is known as "sponge-rubber," longitudinally ribbed, although any other suitable material may be employed. The lower roll 6 has its shaft 9 mounted in suitable bearings in the side members 4 of the oscillating frame 2 and is provided at one end with a gear 10. The upper roll 7 has its shaft 11 mounted in arms 12, which constitute part of the movable frame hereinbefore referred to, said arms being pivoted at 13 to standards 14, arising from the oscillating frame 2. When in working position, the two rolls 6 and 7 are pressed toward each other with a yielding pressure, and to effect this I prefer to employ the mechanism shown. At each side of the machine there is mounted loosely on the shaft 9 or some other suitable pivot a lever 15, having a horizontal arm 16 on one side of its pivot, which is normally pressed downward by means of a spring 17, supported on a bolt 18, extending upward from the side member 4 of the frame 2. This bolt passes loosely through a suitable aperture in the rear end of the arm 16, the spring being coiled around the portion of the bolt above said arm 16 and its tension being regulated by a nut 19. On the other side of this pivot the lever 15 is provided with an arm 20, having a beveled end 21, terminating in a shoulder 22. Each arm 12 is provided with a projection 23, preferably in the form of an antifriction-roller, the inclined or beveled ends 21 of the levers 15 lying in the path of the projections 23 and said projections being adapted when the machine is in operation to engage with the shoulders 22, which are held against them by the action of the springs 17.

Figure 1:
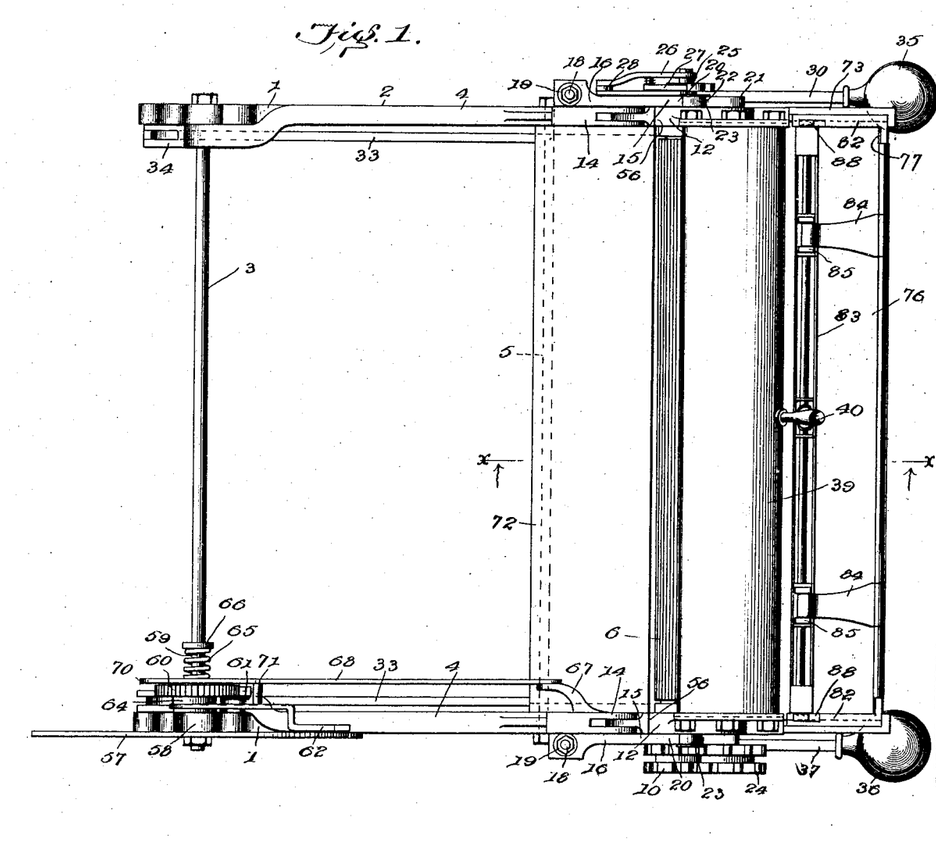
Figure 1 is a plan view of a machine embodying my invention in one form.
Figure 2:
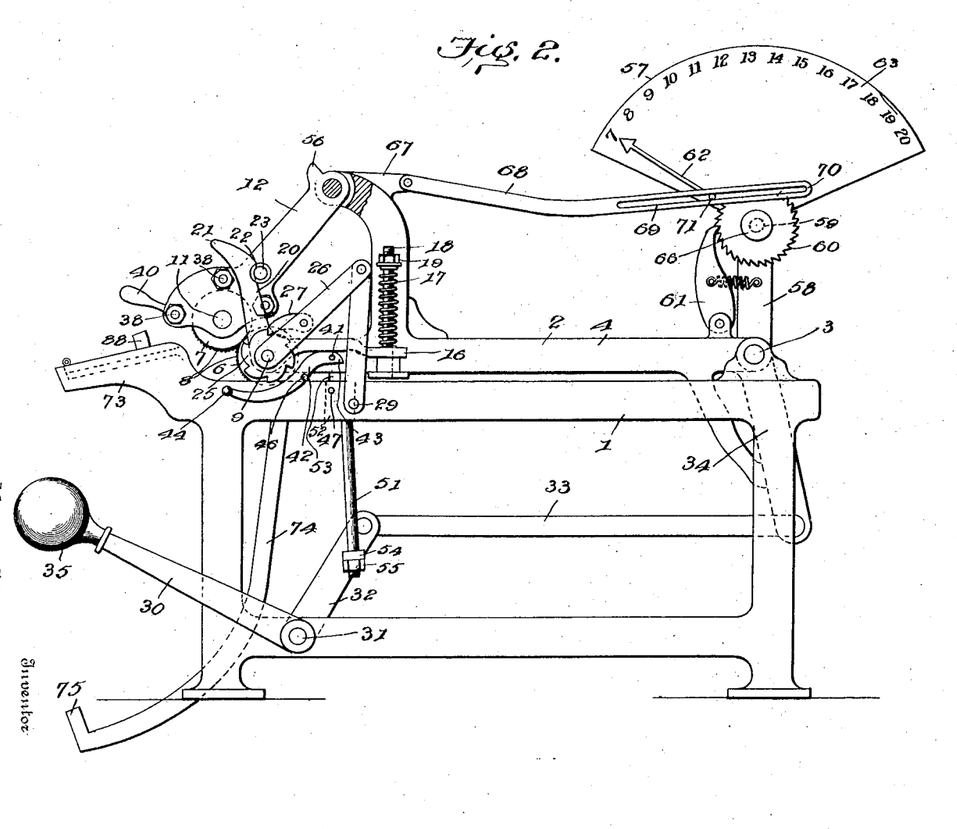
Fig. 2 is an elevation of the same viewed from one side of the machine.
Figure 3:
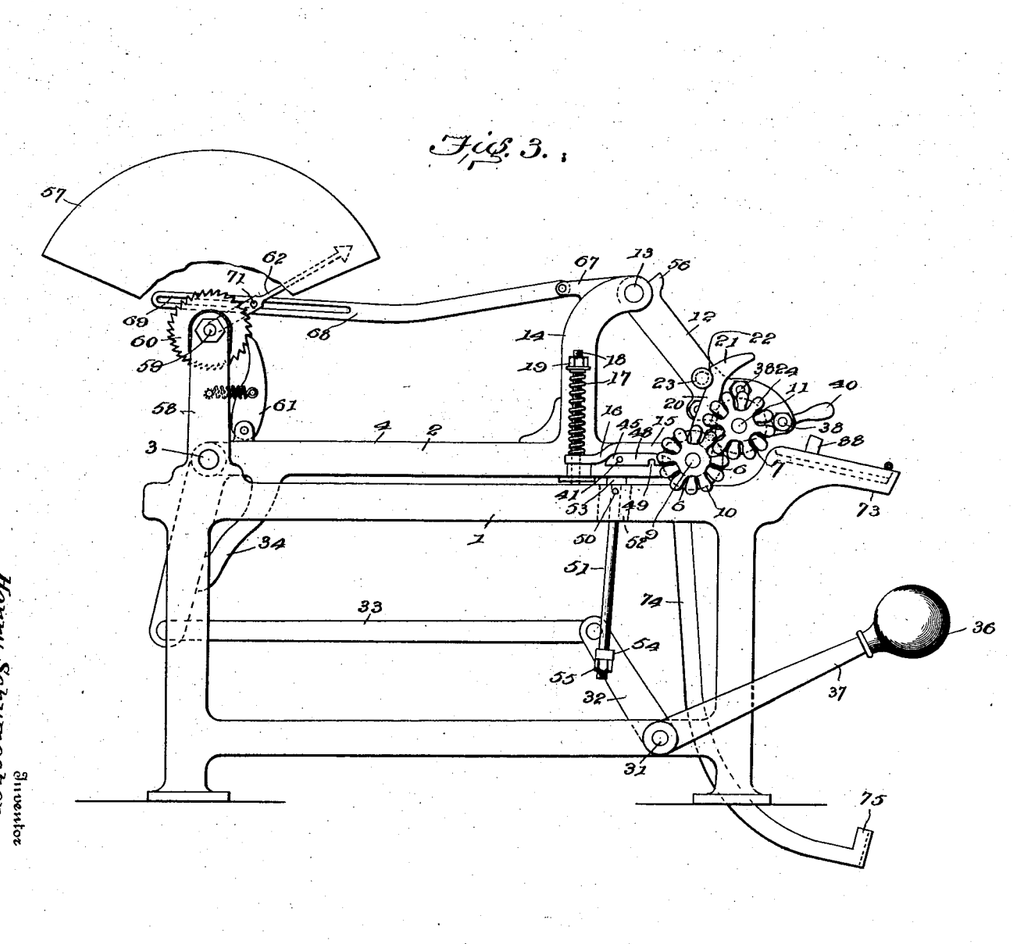
Fig. 3 is an elevation viewed from the opposite side of the same.
Figures 4, 5:
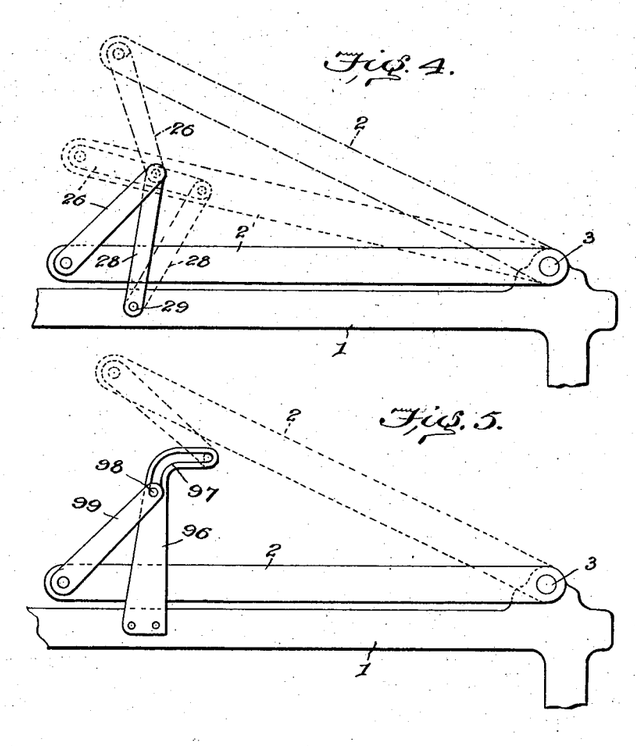
Fig. 4 is a detail view illustrating different positions of the oscillating frame.
Fig. 5 is a view similar to Fig. 4, illustrating a modification of the means whereby the feed motion of the sizing-rolls is effected.

The shaft 11 of the upper roll 7 is provided with a gear 24, which meshes with the gear 10 when the rolls are brought together in operative position, and these gears are preferably of the well-known double type shown. An intermittent rotary motion is imparted to the sizing-rolls, and I prefer for that purpose the mechanism shown in Figs. 1 to 4. In this construction the shaft 9 of the lower roll is provided with a ratchet-wheel 25, secured thereon, and a pawl-arm 26 is mounted loosely on the shaft 9 adjacent to said ratchet-wheel and is provided with a spring-pawl 27, adapted to engage the teeth thereof. The other or free end of the pawl-arm 26 is pivoted to the upper end of a link 28, the lower end of which is pivoted at 29 to the main frame 1. It results from this construction that when the free end of the oscillating frame 2 is moved upward the free end of the pawl-arm will be held down into the position indicated in Fig. 4, the pawl slipping over the ratchet-wheel without affecting the rolls. Upon the return or downward movement of the oscillating frame the pawl will engage one of the teeth of the ratchet and will impart a partial movement of rotation to the shaft 9, and consequently to the sizing-rolls. The parts may be so constructed that the actual forward movement of the peripheral surfaces of the rolls at each complete up-and-down movement of the oscillating frame may be of any desired predetermined length, and in practice I prefer to make the range of movement one inch.

The oscillating movement of the frame 2 just referred to may be effected in any suitable manner; but I prefer for that purpose the mechanism shown, in which 30 indicates an operating-lever, secured on a shaft 31, mounted in the frame 1 at the front of the machine. The shaft 31 is provided with arms 32, which are connected by links 33 with an arm 34, depending from the rear of the oscillating frame 2, so that a downward pressure by the operator upon the lever 30 will raise the frame 2, while an upward movement of said lever will lower said frame. The weight of the frame and its mechanism may be counterbalanced in any suitable manner—as, for instance, by a counterweight 35, mounted on the lever 30, and a similar counterweight 36, mounted on an arm 37, secured to the end of the shaft 31 opposite to that on which the lever 30 is mounted.

The mounting of the upper roll in a movable frame is primarily for the purpose of permitting the rolls to be separated, so that the leaves of tobacco may be introduced between them. This separation may be effected by simply pulling up on the frame in which the upper roll is mounted. This frame, as already stated, comprises pivoted arms 12, and it also comprises cross-rods 38, connecting said arms 12 immediately above the roll 7, said cross-rods being in turn connected by a sheet-metal guard-plate 39, which covers and protects the upper roll 7 and at the same time strengthens the movable frame.

40 indicates a handle by means of which the upper-roll frame may be readily lifted, said handle being preferably secured to the transverse member of said frame formed by the rods 38 and guard 39 at about the middle of said member. When a sufficiently forcible upward pull is exerted on this handle, the projections 23 will force back the arms 20 of the levers 15, compressing the springs 17 and permitting the projections to slip past the shoulders 22, thus allowing the upper-roll frame to be lifted independently of the oscillating frame 2. When the upper-roll frame is lowered, the projections 23 strike on the inclined or beveled ends 21 and the levers 15 yield, so as to permit said projections to pass and seat themselves behind the shoulders 22. I prefer, however, to provide means for positively disengaging the levers 15 from the projections 23 before the upper-roll frame is lifted, and for this purpose there is mounted in the frame 2 a transverse rock-shaft 41, which projects beyond the longitudinal members 4 of the frame 2 at each end thereof immediately underneath the horizontal arms 16 of the levers 15. Upon one side of the machine there is mounted on the projecting end of the shaft 41 a lever 42, which lies underneath the corresponding arm 16 and which is provided with a cam projection 43, which will lift said arm 16 and disengage the lever 15 when the operating-lever 42 is depressed. Said operating-lever extends to the front of the machine, where it terminates in a handle 44 within convenient reach of the operator. Upon the other end of the shaft 41 there is located a similar cam projection 45, lying underneath the arm 16 at that side, so that when the rock-shaft 41 is turned by a downward movement of the lever 42 both locking-levers 15 are simultaneously disengaged from the upper-roll frame, leaving it free to be moved upward.

As there is sometimes a tendency for the oscillating frame 2 to move upward when the upper-roll frame is swung up, I provide against such movement of the oscillating frame by means of a locking mechanism which locks the oscillating frame firmly to the main frame when the upper-roll frame is disengaged in the manner just described. To this end the lever 42 is provided in its under edge with a notch 46, in the path of which lies a pin or projection 47 on the main frame 1. When the lever 42 is moved downward to free the upper-roll frame, the pin 47 lies within the notch 46 and prevents any upward movement of the frame 2, in which the lever 42 is mounted. When the parts are in this position, the cam projection 43 has its contact-point with the arm 16 vertically above the center of the shaft 41 or slightly past the center, so that the springs 17 tend to hold the parts in locked position. At the other side of the machine the cam projection 45 has an arm or extension 48 lying on the opposite side of the shaft 41 from the said cam projection, said arm 48 being provided in its lower edge with a notch or recess 49, in the path of which lies a pin 50 on the main frame 1, these parts serving to lock the frame 2 on their side of the machine in the same manner as the lever 42 with its notch 46 and the pin 47 on the opposite side of the machine.

To provide means for limiting and cushioning the movements of the frame 2, I employ stop-rods 51, pivoted at their upper ends to the frame 2, preferably by hanging them loosely on the shaft 41. These stop-rods pass vertically downward through slots 52 in the upper longitudinal members of the main frame 1. At their upper ends they are provided with cushions or buffers 53, of rubber or the like, arranged above the frame 1, while their lower ends are provided with similar buffers 54 and terminal nuts 55 for supporting and adjusting said buffers. During the upward movement of the frame 2 the buffers 54 will travel toward the upper member of the main frame and will finally come into contact with it, thus limiting the upward movement of the frame 2 and at the same time cushioning the arrest of said movement. At the limit of downward movement of the frame 2 the buffers 53 come into contact with the top of the frame 1 and cushion the movement at this end.

To limit the upward movement of the upper-roll frame, I provide the arms 12 with stop projections 56, which come into contact with the tops of the brackets 14 when said upper-roll frame is fully lifted.

In connection with the machine I employ an indicator to show the operator just what size of leaf is delivered by the machine at any given operation thereof. This comprises an indicator-plate 57, mounted on a standard 58, arising from the main frame 1 at the rear of the machine. In this standard there is mounted a shaft 59, carrying a ratchet-wheel 60, with which engages a spring-pawl 61, carried by the oscillating frame 2, the construction being such that the ratchet-wheel is advanced one tooth for each complete up-and-down movement of the frame 2.

62 indicates an index or pointer loosely mounted on the shaft 59 and coöperating with a scale 63 on the plate 57. This scale preferably indicates the length of the leaves in inches, as shown. The ratchet-wheel 60 is loosely mounted on the shaft 59, and a washer 64, of fiber or other frictional material, is located between the hub of the pointer 62 and the adjacent face of the ratchet-wheel 60. A spring 65, controlled by a nut 66, is mounted on the outer end of the shaft 59 and is adjusted to create sufficient friction between the ratchet-wheel and pointer to cause this latter to move with the former. In order to return the pointer to its initial position after the machine has operated upon one batch of leaves, I provide a resetting mechanism which is operated by the swinging upward of the upper-roll frame to receive the next batch of leaves. To this end one of the arms 12 of said frame is provided on the opposite side of its pivot-shaft 13 from that on which the said arm is located with an arm 67, to which is attached the forward end of a link 68, slotted at its rear end, as shown at 69, said slot terminating in the rear wall 70. The pointer 62 is provided with a projection 71, which extends into the slot 69. When the upper-roll frame is lifted to its full extent, the arm 67 moves downward and forward, pulling the link 68 forward along with it, and the rear end wall 70 of the slot in said link comes into contact with the projection 71 on the pointer 62 and moves said pointer back to its initial position, the frictional connection between the ratchet-wheel and pointer permitting this movement of the pointer.

The main frame 1 of the machine is provided with a table 72 in the rear of the sizing-rolls, while said frame is also provided in front of said rolls with a support 73 for the holder, hereinafter referred to, in which the leaves are alined and held when delivered to the machine.

74 indicates a receiving-plate extending downward and forward from a point below the sizing-rolls, its lower end being bent forward to form a receptacle for the leaves as they fall from the rolls and terminating in a stop 75, which arrests their descent and retains them within the said receptacle.

Figures 6, 8:
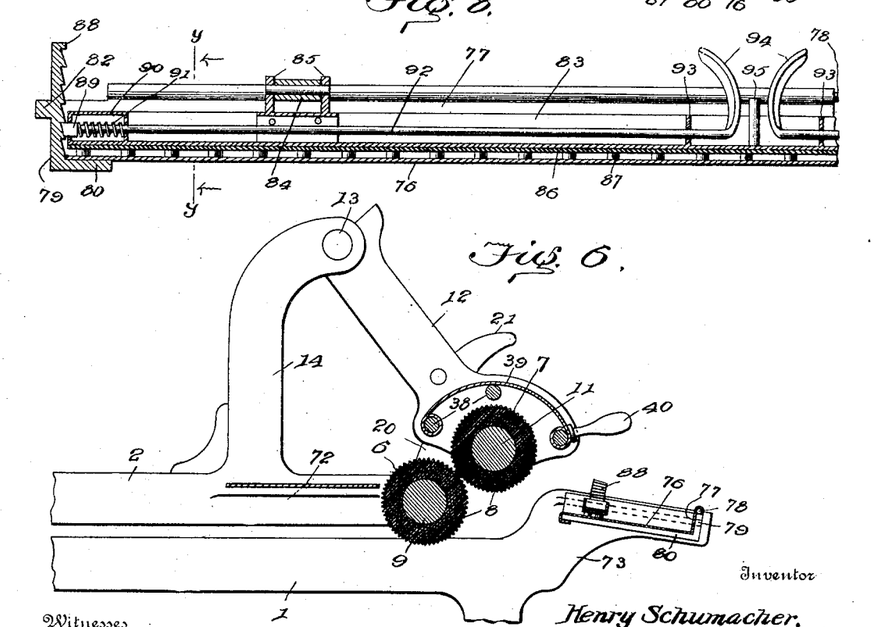
Fig. 6 is a detail view in vertical longitudinal section, taken on the line $xx$ of Fig. 1 and looking in the direction of the arrows.
Fig. 8 is a detail view of a portion of the same in central longitudinal section.
Figures 7, 9:
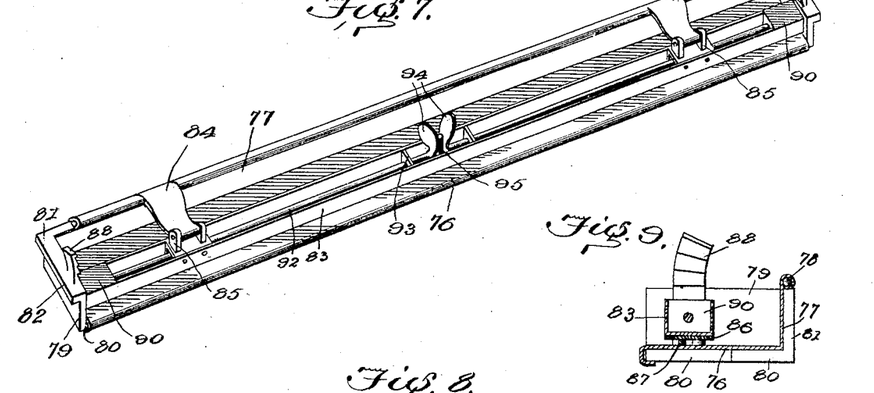
Fig. 7 is a perspective view of one of the leaf-holders.
Fig. 9 is a detail sectional view taken on the line $yy$ of Fig. 8 and looking in the direction of the arrows.

Prior to being subjected to the operation of the machine the leaves are alined and held in a holder. (Shown in detail in Figs. 7, 8, and 9 of the drawings.) This holder comprises a base or plate providing a surface on which the leaves may rest, an alining-stop against which the butt or stem ends of the leaves are alined, and means for clamping or holding the leaves in alined position while they are being delivered to the machine. The form of holder which I prefer is that shown in which the base or main supporting-surface which constitutes the bottom of the holder is indicated at 76, while the alining-stop forming the back of the holder is indicated by the reference-numeral 77. These parts are preferably formed of sheet metal in a single piece, the upper edge of the part 77 being strengthened by means of a rod or wire 78, around which it is bent. Each end of the holder is formed of a casting having a vertical body portion 79, provided with a horizontal flange 80 at its lower edge to receive the sheet-metal bottom 76, a vertical flange or portion 81 at right angles to the body 79 to receive and support the sheet-metal back 77, and an outwardly-extending horizontal flange 82 at its upper edge to engage the support 73, which is recessed, as shown, to receive the holder. It will thus be seen that the holder is open at the top and front and closed at the bottom, rear, and ends. The clamping mechanism preferably consists of a clamping-bar 83, which is preferably formed of metal (channel or U shape) and which is also preferably pivoted to the body of the holder. In the present instance I have shown this connection as effected by means of arms or links 84, pivoted at their rear ends on the rod 78, while their forward ends are pivoted between lugs 85, arising from the back from the clamping-bar. The under face of the clamping-bar is provided with a yielding covering consisting, preferably, of rubber, as indicated at 86, said rubber facing being provided with projections 87, also of rubber. In order to hold the clamping-bar in clamping position, I prefer to employ the mechanism shown, consisting of a ratchet-bar 88 at each end of the holder and coöperating spring pawls or bolts 89 at each end of the clamping-bar. The ratchet-bars 88 are preferably formed in one piece with the castings which form the ends of the holder. The pawls or bolts 89 are mounted to slide longitudinally of the clamping-bar in housings 90 at each end of said bar and are provided with springs 91, which force them normally outward into engagement with the ratchets. Each pawl or bolt 89 is provided with an elongated stem or operating-rod 92, extending longitudinally of the clamping-bar through suitable guides 93. The inner ends of these rods lie adjacent to each other and are provided with finger plates or grips 94, which may be readily grasped by the fingers of one hand and drawn toward each other to disengage the pawls or bolts from the ratchets. A central stop 95, located midway between the finger-holds 94, serves to limit the inward motion of each rod 92, so as to insure the releasing of both pawls when the operating-rods are drawn toward each other.

In the operation of the machine thus constructed it is preferred that one operator shall control the machine, while one or more assistants will deliver to the machine the leaves by means of the holders just described, of which a plurality will be employed for each machine. The assistant, with the holder before him, the clamping-bar being disengaged and swung back out of the way, so as to leave the body of the holder free and unobstructed, proceeds to fill the holder with leaves of tobacco, which are operated upon when moist and in a flexible and not brittle condition. The leaves are laid in the holder with their stem ends or butts against the alining-stop 77, the longitudinal axes of the leaves lying at right angles to the plane of said stop. It will be understood that the holder rests upon a suitable table or support while being filled, the leaves being of much greater length than the width of the bottom 76 from front to rear, so that while the butts of the leaves rest upon the bottom 76 of the holder the remaining portions of the leaves extend forward of the holder a suitable distance, resting upon the table or support. When the holder has thus been filled with leaves with their butt-ends alined, the clamping-bar 83 is swung down upon the leaves with sufficient pressure to hold them firmly in place in the holder without injuring them, and the pawls 89 engaging with the ratchets 88 will automatically hold the clamping-bar in proper clamping position. The holder thus filled with leaves is carried to the machine and placed upon the table 72, with its back or stop flange 77 toward the front of the machine. Assuming that the operator is ready to size this particular batch of leaves, he first swings the upper-roll frame upward either by pulling up on the handle 40 directly or by first pressing down upon the lever 42, thereby first disengaging the locking-levers 15 and then swinging the upper-roll frame upward. This operation also returns the pointer 62 to its initial position ready to indicate the length of the first group of leaves delivered by the machine. The holder is then moved forward over the lower sizing-roll 6 and placed in position on the support 73. The leaves will then be all supported at their tip ends by the roll 6, over which they extend from the holder toward the rear of the machine. The distance between the stop 77 of the holder when in position in the support 73 and the top of the roll 6 is as great as or greater than the length of the smallest leaf handled by the machine—in the present instance seven inches—as indicated on the dial 57. The upper-roll frame is then swung down, so as to grip all of the leaves between the two rolls, the upper roll being forced against the lower roll with a yielding pressure, due to the springs 17. The character of the working surfaces of the rolls is such as to hold and feed the leaves without injuring them. The clamping-bar of the holder is then disengaged and swung up out of the way, and at this time or subsequently the holder may be removed from the machine to be refilled. The sizing or sorting operation then begins, the operator pressing downward on the lever 30 and then lifting said lever or permitting it to rise. This causes the oscillating frame 2 to make one complete oscillation upward and downward. The upward movement advances the pointer or indicator to the position shown in the drawings, indicating the size of the leaves to be delivered at this particular movement of the machine. The downward movement of the frame 2 imparts a partial movement of rotation to the feeding-rolls, moving the leaves between the rolls forward toward the front of the machine, and all of the leaves which are seven inches in length or between seven or eight inches but under eight inches will pass clear of the rolls and will fall upon the receiving-plate 74, down which they pass by gravity into the receptacle formed by the lower part of said plate, their descent being arrested by the stop 75. The jar or shock attendant upon the arrest of the downward movement of the oscillating frame insures the discharge of any leaves which have been fed clear of the rolls, but which might not otherwise fall into the receptacle on account of their contact or entanglement with other leaves which are not yet free. The feed of the leaves forward with their butt-end or heaviest parts at the front of the rolls and depending downward therefrom insures the falling of the leaves in such a way that their butt-ends will first strike the inclined receiving-plate 74, down which they will pass with a gradually-decreasing velocity owing to the frictional resistance and the decreasing steepness of the incline which the curvature of the plates presents. When the motion of the leaves is finally arrested at the bottom of the plate 74 by contact of the butt-ends of the leaves with the stop 75, the leaves come to rest in a position parallel with each other and with their butt-end alined, so that they may be readily grasped and handled thereafter as may be required. These leaves are then gathered up before the next operative movement of the machine and placed in a suitable bin or receptacle. The operator then again oscillates the frame 2, whereupon the indicator will be advanced another number and all of the leaves over eight inches but under nine inches in length will be delivered from the machine. Each group of leaves is of course gathered or carried away in any suitable manner before the next group of leaves is delivered from the machine, and the pointer will always indicate upon the scale the size of the leaves which the machine is delivering. This series of operations proceeds until all of the leaves have been discharged from between the sizing-rolls, whereupon the upper-roll frame is again swung up, resetting the indicator to its initial position, and another holder is placed in position upon the support, whereupon the series of operations already described proceeds as before.

It will be at once seen that the machine is capable of operating upon a very great number of leaves at one and the same time, and that the operation of sizing or sorting these leaves is rapidly and accurately performed. Moreover, this operation is automatically accomplished and does not depend upon the accuracy or training of the operator, so that unskilled labor may be employed. Furthermore, the temptation to accelerate the work by the destruction of a portion of the leaves is entirely done away with, and a source of great loss is thus avoided.

Obviously modifications in the details of construction may be made without departing from the principle of my invention. For instance, I have shown in Fig. 5 a construction in which the links 28 are dispensed with, fixed arms 96 being employed in their stead provided with cam grooves or slots 97, which are engaged by pins 98 on the free ends of arms 99, which correspond with the arms 26. In this way the roll-shaft 9 may be operated to impart to it an intermittent rotary movement when the main frame 2 is oscillated. Other modifications will readily suggest themselves, and I therefore do not wish to be understood as limiting myself strictly to the precise details of construction hereinbefore described and shown in the accompanying drawings.

Having thus fully described my invention, what I claim as new, and desire to secure by Letters Patent, is—

1. A machine for sizing tobacco-leaves, comprising sizing devices adapted to grip a plurality of leaves between them, means for alining the leaves and presenting them lengthwise to the sizing devices, and means for imparting to the sizing devices an intermittent motion to feed the leaves forward, whereby the leaves within a given range of size are simultaneously discharged at each feeding movement of the sizing devices, substantially as described.

2. A machine for sizing tobacco-leaves, comprising sizing devices adapted to grip a plurality of leaves between them, means for presenting the leaves to the sizing devices lengthwise and substantially parallel, with one end alined, and means for imparting to the sizing devices an intermittent motion to feed the leaves forward out of the grip of said devices, substantially as described.

3. A machine for sizing tobacco-leaves, comprising sizing-rolls, means for alining a plurality of leaves and presenting them lengthwise and substantially parallel with each other to the rolls, and means for imparting to the rolls an intermittent rotary motion in the direction of the alined ends of the leaves, substantially as described.

4. A machine for sizing tobacco-leaves, comprising sizing-rolls having yielding working surfaces, means for alining a plurality of leaves and presenting them to the rolls lengthwise and substantially parallel with each other, and means for imparting to the rolls an intermittent rotary motion, substantially as described.

5. A machine for sizing tobacco-leaves, comprising sizing-rolls adapted to yieldingly grip a plurality of leaves, means for presenting the leaves to the rolls lengthwise and substantially parallel with each other, and in alinement at one end, and means for imparting to the rolls an intermittent motion, substantially as described.

6. A machine for sizing tobacco-leaves, comprising sizing-rolls, means for yieldingly pressing one of said rolls toward the other, means for presenting a plurality of leaves to the rolls lengthwise and substantially parallel with each other, and in alinement at one end, and means for imparting to said rolls an intermittent rotary motion, substantially as described.

7. A machine for sizing tobacco-leaves, comprising sizing-rolls adapted to yieldingly grip a plurality of leaves between them, means for separating said rolls to permit the introduction of the leaves, means for presenting the leaves to the rolls lengthwise and substantially parallel to each other and alined at one end, and means for imparting to the rolls an intermittent rotary motion, substantially as described.

8. In a machine for sizing tobacco-leaves, two parallel sizing-rolls, one of which is movable relatively to the other, and spring-actuated locking-arms normally engaging said movable roll to press it yieldingly toward the other roll, said movable roll being separable from the other roll when said locking-arms are disengaged, substantially as described.

9. In a machine for sizing tobacco-leaves, two parallel sizing-rolls, one of which is movable toward and from the other, spring locking-arms normally engaging said movable roll and pressing it yieldingly toward the other roll, and means for disengaging said locking-arms, substantially as described.

10. In a machine for sizing tobacco-leaves, a main frame, in combination with an oscillating frame mounted therein, sizing-rolls, one of which is mounted in said oscillating frame, a movable frame mounted in the oscillating frame and carrying the other sizing-roll, and means actuated by the oscillations of said oscillating frame to impart an intermittent rotary motion to said sizing-rolls, substantially as described.

11. In a machine for sizing tobacco-leaves, the combination, with a main frame, of a frame movable therein and carrying parallel sizing-rolls, and means actuated by the movements of said frame to impart to said rolls an intermittent rotary motion, substantially as described.

12. In a machine for sizing tobacco-leaves, the combination, with a main frame, of an oscillating frame mounted therein, means for oscillating said frame, a sizing-roll mounted in said oscillating frame, a roll-supporting frame carried by said oscillating frame and movable relatively thereto, a roll mounted in said supporting-frame, means for pressing said last-mentioned roll and frame toward the other roll with a yielding pressure, means for supporting said rolls to permit the introduction of the leaves, and means actuated by the oscillations of said oscillating frame to impart to said rolls an intermittent rotary motion, substantially as described.

13. In a machine for sizing tobacco-leaves, the combination, with a main frame, of an oscillating frame mounted therein, two parallel sizing-rolls carried by said frame, one of said rolls being mounted in the oscillating frame, a frame pivoted to said oscillating frame and carrying the other roll, means for yieldingly pressing said pivoted frame and roll toward the other roll, gearing connecting said rolls when in operative position, a ratchet-wheel mounted on the lower-roll shaft, and a pawl-arm loosely mounted on said shaft, provided with a spring-pawl, and connected with the main frame, whereby the oscillations of the oscillating frame impart an intermittent rotary motion to the rolls, substantially as described.

14. A machine for sizing tobacco-leaves, comprising sizing devices adapted to grip a plurality of leaves between them, means for alining the leaves and presenting them lengthwise to the sizing devices, means for imparting to the sizing devices an intermittent motion to feed the leaves forward, whereby the leaves within a given range of size are simultaneously discharged at each feeding movement of the sizing devices, and means for indicating at each movement the size of the leaves thus discharged, substantially as described.

15. In a machine for sizing tobacco-leaves, the combination, with a main frame, a frame movable therein and carrying a sizing-roll, and a supplemental frame mounted on said movable frame, movable relatively thereto, and carrying the other sizing-roll, of means actuated by the movements of the main movable frame to impart to said sizing-rolls an intermittent rotary movement, an indicating-scale, a pointer coöperating therewith, means actuated by the movements of the main movable frame to advance said pointer relatively to said scale at each movement of said main movable frame, and connecting mechanism between said supplementary frame and said pointer, whereby the pointer is returned to its initial position when said supplementary frame is moved to permit the introduction of a new batch of leaves, substantially as described.

16. In a machine for sizing tobacco-leaves, a main frame, a frame movable therein and carrying a sizing-roll, a supplemental frame mounted on said movable frame, movable relatively thereto, and carrying a second sizing-roll, locking devices for yieldingly pressing said supplemental frame and its roll toward the other roll, and means for disengaging said locking devices and simultaneously locking the main movable frame relatively to the main frame, substantially as described.

17. In a machine for sizing tobacco-leaves, the combination, with intermittently-rotating sizing-rolls, and means for separating the same, of a support located adjacent to said rolls, and an alining-holder provided with means for clamping a plurality of leaves, said holder removably fitting said support, substantially as described.

18. In a machine for sizing tobacco-leaves, the combination, with a main frame, of separable sizing-rollers mounted therein, means for imparting to said rollers an intermittent rotary motion, the main frame being provided with a table on one side of said rollers and a support on the other side, and alining-holders provided with leaf-clamping devices, adapted to rest on said table and to pass between the rolls when separated, said support successively supporting and positioning said holders in front of the rolls, substantially as described.

19. In a machine for sizing tobacco-leaves, an alining and clamping holder open at the top and front, having an alining-stop at the rear, and provided with clamping means for holding a plurality of leaves in substantial parallelism with their greater portions projecting beyond said holder, substantially as described.

20. In a machine for sizing tobacco-leaves, an alining holder comprising a base and an alining-stop at the back thereof, a clamping-bar connected thereto by hinged links, ratchets carried by said holder, and spring-pawls carried by said clamping-bar, and adapted to engage said ratchets, substantially as described.

21. In a machine for sizing tobacco-leaves, the combination, with sizing devices for discharging the leaves in batches of similar size, of an inclined receiving-plate located below said sizing devices to receive the leaves as they fall therefrom, said plate being provided with a terminal stop to arrest and aline the leaves, substantially as described.

22. In a tobacco-sizing machine, the combination, with sizing devices adapted to discharge the leaves in batches of similar size, of an inclined receiving-plate located below said sizing devices, the lower portion of said plate being bent forward to form a receptacle for the leaves, and being provided with a terminal alining-stop, substantially as described.

In testimony whereof I affix my signature in presence of two witnesses.

HENRY SCHUMACHER.

Witnesses:
IRVINE MILLER,
GERTRUDE YOUNG.